United States Patent [19]
Buckley

[11] Patent Number: 5,301,435
[45] Date of Patent: * Apr. 12, 1994

[54] PRISM ASSEMBLY HAVING MULTI-DIRECTIONAL REFLECTIVITY AND TARGETING

[75] Inventor: Galen L. Buckley, Dana Point, Calif.

[73] Assignee: Pyramid Optical, Inc., Irvine, Calif.

[*] Notice: The portion of the term of this patent subsequent to Jan. 12, 2008 has been disclaimed.

[21] Appl. No.: 333,998

[22] Filed: Apr. 4, 1989

[51] Int. Cl.⁵ .............................................. G01C 15/06
[52] U.S. Cl. .................................... 33/293; 359/529
[58] Field of Search ............... 33/293, 294, 295, 296; 350/102, 109, 286, 287; 356/1, 3, 4.5, 4, 5, 18, 19

[56] References Cited

U.S. PATENT DOCUMENTS

| | | | |
|---|---|---|---|
| 2,885,670 | 5/1959 | Kirgan | 350/102 |
| 4,117,455 | 9/1978 | Cervantes | 116/63 P |
| 4,127,972 | 12/1978 | Reimoser | 33/293 |
| 4,343,550 | 8/1982 | Buckley et al. | 33/293 |
| 4,416,509 | 11/1983 | Milan | 350/102 |
| 4,803,784 | 2/1989 | Miller | 33/293 |

FOREIGN PATENT DOCUMENTS

| | | | |
|---|---|---|---|
| 1541265 | 10/1968 | France | 33/293 |
| 616229 | 3/1980 | Switzerland | 33/293 |

Primary Examiner—William A. Cuchlinski, Jr.
Assistant Examiner—Patrick R. Scanlon
Attorney, Agent, or Firm—Leonard Tachner

[57] ABSTRACT

A prism assembly and sighting target which are omni-directional in azimuth and which provide a plurality of prisms dispersed symmetrically around the radial wall of a cylinder for reflecting incident laser light from any direction over 360 degrees in azimuth. A uniquely shaped sighting target for use with the prism assembly of the invention provides a visible target pattern from any direction over 360 degrees in azimuth. A cylindrical housing portion of the invention provides receptacles for receiving six prisms spaced at 60 degree intervals so that irrespective of the angle of azimuth from which the laser light is incident, a sufficient amount of light energy is reflected back to the laser light instrument to permit distance measuring over a pre-selected minimum distance.

7 Claims, 2 Drawing Sheets

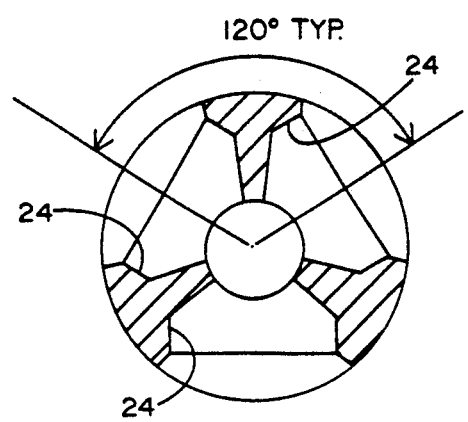
FIG. 4
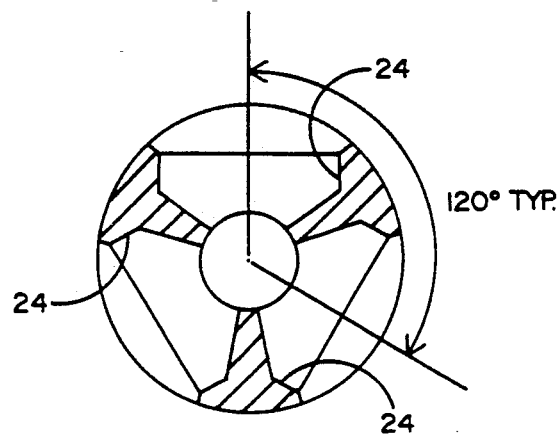
FIG. 5
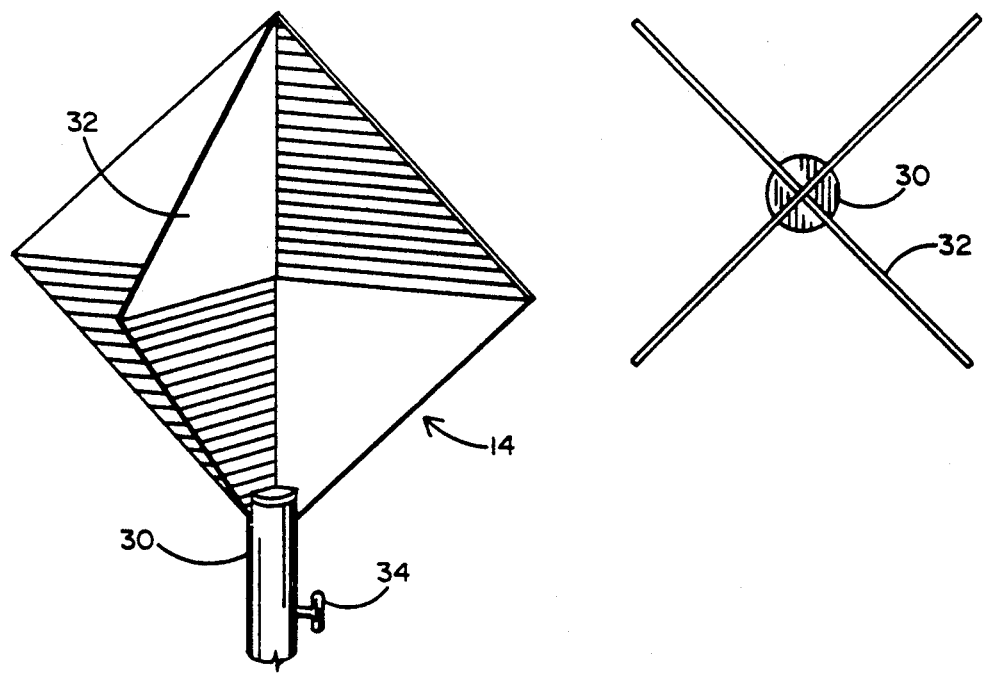
FIG. 6
FIG. 7

PRISM ASSEMBLY HAVING MULTI-DIRECTIONAL REFLECTIVITY AND TARGETING

BACKGROUND OF THE INVENTION

1. Field of the Invention

The present invention relates generally to prism assemblies used in surveying and the like and more specifically to an omni-directional azimuth prism assembly designed to hold a plurality of retro-reflecting prisms distributed symmetrically about the radial wall of a cylinder for reflecting light received from any azimuth direction and over a preselected range of elevation.

2. Prior Art

Retro-reflecting prism assemblies have been used for many years as as adjunct to laser distance measuring instruments in surveying and civil engineering. All such prior art prism assemblies known to the applicant herein, typically provide one or a plurality of prisms all pointed in the same direction for retro-reflection of incident laser light over a limited angle of incidence in azimuth and elevation. Such a substantially uni-directional configuration is perfectly satisfactory for most applications where a measurement of distance between the position of a unitary source of light and the position of the retro-reflector is all that is required. Unfortunately, there occasionally arises the need to provide distance measurement to a fixed retro-reflective position from a variety of light source positions disbursed radially or in azimuth around the location of the retro-reflective prism. For example, one such need arises when the prism assembly is positioned at the center intersection of two or more streets or thoroughfares and it is desired to measure the distance to that center of intersections at displaced points in each of the intersecting streets or thoroughfares. In such applications, it is unlikely that the prism assembly will be properly positioned and directed for all desired positions of the laser light source. As a consequence thereof, each time the measurement is made from a different laser light source location, it is necessary to reorient the direction of the retro-reflective prisms. Thus for example, in a typical case of two streets intersecting at ninety (90) degrees, the prism assembly can be properly positioned only for one of the four possible directions from which the laser light may be emanating. As a result, each time the laser light source is repositioned, it is necessary for personnel to take the time and effort and incur the danger of going to the prism assembly location and reorienting the prism to be directed toward one of the other desired positions of the laser light source.

Typically, there is a sighting target which is associated with the retro-reflective prism assembly in order to reduce the difficulty of pointing the laser light source toward the prism assembly and which, for example, may be as far as a thousand yards from the prism assembly. Like the prism assemblies of the prior art, such sighting targets are also normally designed for unidirectional operation. More specifically, it is typical for such sighting targets to be oriented on the prism assembly in such a way that they face in the same direction as the unidirectional prisms. Accordingly, in applications requiring reorienting the prism assembly such as for the purpose previously described, it would also be necessary to reorient the sighting target to permit sighting of the prism assembly from the laser light source from each of the repositioned locations such as in the intersecting street scenario previously described.

There has therefore been a long felt need for a prism assembly which provides both prisms and sighting target capabilities which permit positioning of a laser light source instrument at any azimuth angle over a 360 degree dispersion relative to the prism assembly for use therewith without requiring reorientation of the prism assembly each time the laser light source is relocated.

SUMMARY OF THE INVENTION

The present invention solves the aforementioned long felt need by providing a prism assembly and sighting target which are omni-directional in azimuth and thereby fills the aforementioned long felt need. More specifically, the present invention provides a prism-assembly comprising a plurality of prisms dispersed symmetrically around the radial wall of a cylinder for reflecting incident laser light from any direction over 360 degrees in azimuth. Furthermore, the present invention provides a uniquely shaped sighting target for use with the prism assembly of the invention wherein the sighting target also provides a visible target pattern from any direction over 360 degrees in azimuth. A cylindrical housing portion of the invention provides receptacles for receiving six prisms spaced at sixty degree intervals so that irrespective of the angle of azimuth from which the laser light is incident, a sufficient amount of light energy is reflected back to the laser light source instrument to permit distance measuring over a preselected distance such as 1,000 yards.

OBJECTS OF THE INVENTION

It is therefore a principal object of the present invention to provide a retro-reflective prism assembly for use in surveying and civil engineering and the like and which is adapted for receiving a plurality of retro-reflective prisms spaced around the entire periphery of the assembly for reflecting incident light omni-directionally in azimuth to preclude the prior art need to reorient the prism assembly to reflect incident light from different azimuth directions.

It is an additional object of the present invention to provide an omni-directional sighting target for use in conjunction with a retro-reflective prism assembly for permitting easy long distance sighting of the retro-reflective prism assembly to which the target is attached, the target comprising a visual indication of a target image from any direction in azimuth around the assembly thereby precluding the prior art need to reorient the sighting target in order to provide an easily recognized visual representation of a target image from different azimuth directions.

It is still an additional object of the present invention to provide a combined omni-directional sighting target and retro-reflective prism assembly which may be readily observed and which readily reflects incoming light energy from any azimuth direction.

It is still an additional object of the present invention to provide a retro-reflective prism assembly for use in surveying and the like, the assembly providing a cylindrically-shaped housing having a plurality of receptacles adapted to receive a like plurality of retro-reflective prisms distributed around the entire periphery of the housing for reflecting incident light received from any azimuth direction over 360 degrees.

BRIEF DESCRIPTION OF THE DRAWINGS

The aforementioned objects and advantages of the invention, as well as additional objects and advantages thereof, will be more fully understood hereinafter as a result of a detailed description of a preferred embodiment when taken in conjunction with the following drawings in which:

FIG. 4 is a cross-sectional view of the assembly of FIG. 2 taken along lines 4—4 of FIG. 2;

FIG. 5 is a cross-sectional view of the assembly of FIG. 2 taken along lines 5—5 of FIG. 2;

FIG. 6 is an isometric representation of the sighting target of the present invention; and FIG. 7 is a top view of the sighting target of the present invention.

DETAILED DESCRIPTION OF A PREFERRED EMBODIMENT

Figures 1, 2:
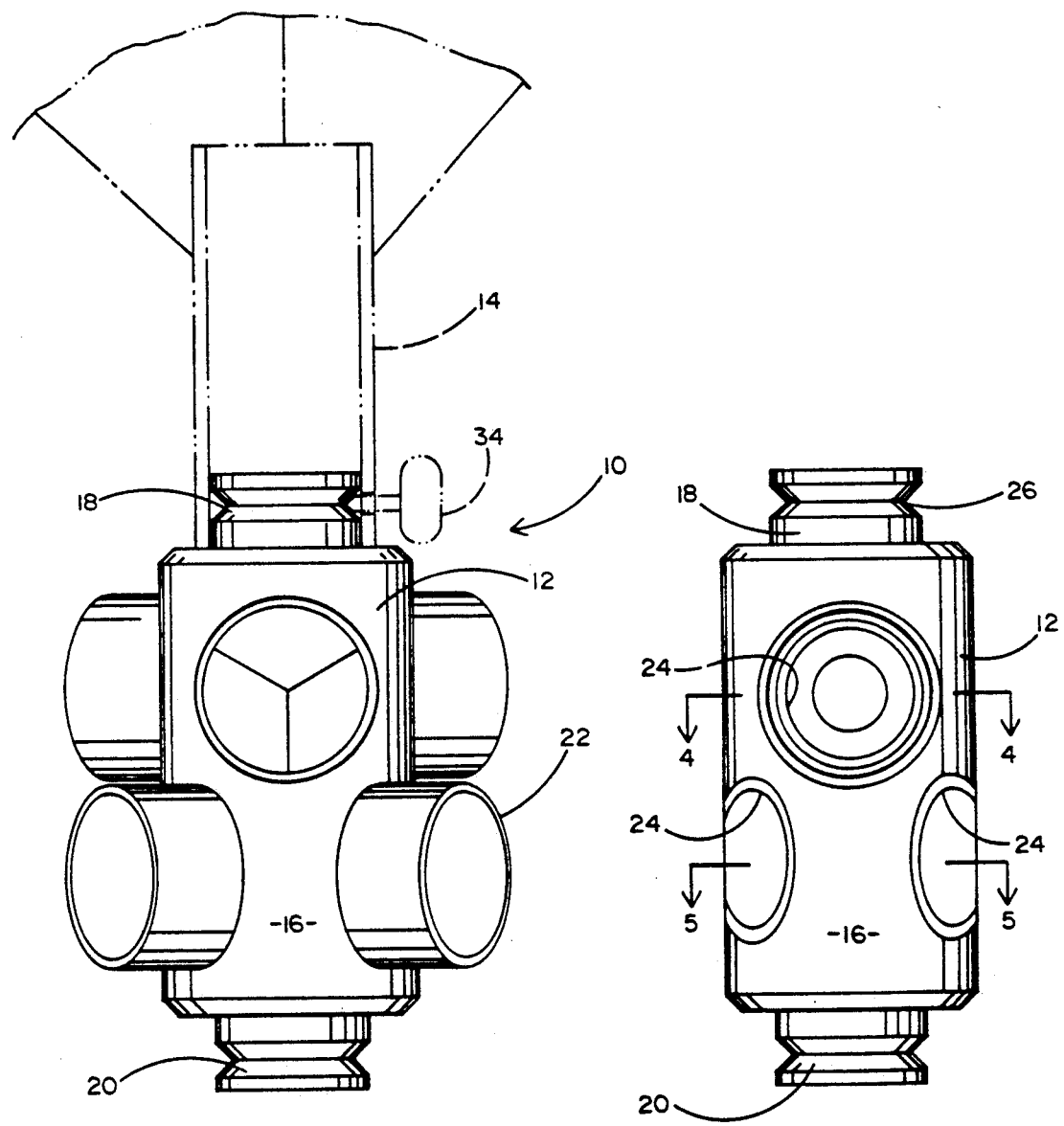
FIG. 1 is an elevational view of the present invention with the sighting target shown in phantom and attached to the retro-reflective prism assembly of the invention.
FIG. 2 is a front elevational view of the retro-reflective prism assembly of the present invention.
Figure 3:
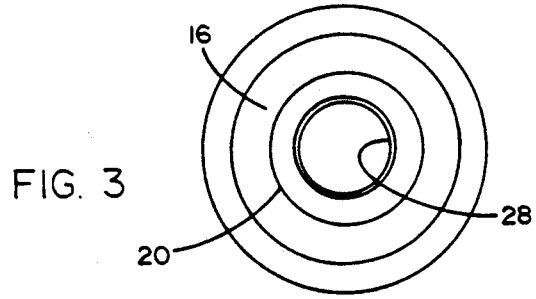
FIG. 3 is a bottom view of the assembly of FIG. 2.

Referring now to FIGS. 1 and 2 it will be seen that the omni-directional prism assembly 10 of the present invention comprises a prism housing 12 and a sighting target 14, the latter being shown in phantom in FIG. 1. Prism housing 12 comprises a cylindrical body 16 having an upper bayonet coupling 18 and a lower bayonet coupling 20. A plurality of prisms 22 are received by a like plurality of prism receptacles 24. As seen in FIGS. 4 and 5, the prism receptacles 24 are provided around the periphery of cylindrical body 16 at two different levels. At each such level, there are three prism receptacles spaced symmetrically about the periphery of the body 16 at 120 degree spacings. The location of each prism along one level of the body 16 as compared to the prisms along the other level of body 16 are spaced relative to one another by 60 degree increments. As used herein the term "azimuth" refers to the radial direction perpendicular to the axis of cylindrical body 16. Based upon that definition, it will be seen in FIGS. 1, 2, 4 and 5 that irrespective of the angle of incidence in azimuth of incoming laser light from an instrument with which the present invention may be used, such incident light energy will be received and reflected by at least two prisms and by as many as three prisms.

Upper bayonet coupling 18 is designed to receive a three-dimensional sighting target which is shown in FIG. 6 and 7 and which is to be discussed hereinafter in more detail. Lower bayonet coupling 20 is designed to receive a standard tripod interface (not shown) for supporting the prism assembly of the present invention at a desired location elevated from ground level. Coupling to bayonet couplings 18 and 20 may be made in either one of two ways. Specifically, the upper and lower couplings are each provided with a threaded, centrally located aperture 28 for receiving a similarly threaded bolt or screw. In addition, each such coupling is provided with a recess 26 around the entire periphery of the coupling, which recess is designed to receive a fastening element, such as fastening element 34 for securing a hollow cylindrical body over the exterior radial surface of the coupling.

The omni-directional sighting target portion of the present invention is shown in FIGS. 6 and 7 and comprises a pair of perpendicularly intersecting diamond-shaped target elements 32, commonly secured at the lower ends thereof to a target interface holder 30. Target interface holder 30 is a hollow cylindrical body, having an aperture through which extends fastening element 34, which may by way of example be a wing nut type fastening element which is adapted to be received into recess 26 when holder 30 is placed over the upper bayonet coupling 18 on the prism housing 12 of FIG. 1. The unique intersecting diamond shape of target elements 32 presents a target-type image to an observer sighting the target 14 from any azimuth direction at a distance from the assembly 10 of the present invention. As seen best in FIG. 6, the target elements 32 are preferably provided with target-type indicia such as triangularly shaped elements which provide parallel lines, shading or a darkened surface adjacent a clear, white or other light color surface.

It will now be understood that what has been disclosed herein comprises a prism assembly and sighting target which are omni directional in azimuth and which provide a plurality of prisms dispersed symmetrically around the radial wall of a cylinder for reflecting incident laser light from any direction over 360 degrees in azimuth. Furthermore, the present invention provides a uniquely shaped sighting target for use with the prism assembly of the invention wherein the sighting target also provides a visible target pattern from any direction over 360 degrees in azimuth. A cylindrical housing portion of the invention provides receptacles for receiving six prisms spaced at 60 degree intervals so that irrespective of the angle of azimuth from which the laser light is incident, a sufficient amount of light energy is reflected back to the laser light instrument to permit distance measuring over a pre-selected minimum distance.

Those having skill in the art to which the present invention pertains, will now as a result of the applicant's teaching herein, perceive various modifications and additions which may be made to the invention. By way of example, the number of prisms and receptacles for prisms provided in the housing of the present invention, as well as the shape of the housing may be readily altered to provide increased reflection of incident laser light or to make the reflecting assembly of the present invention omni-directional in other planes other than the azimuth plane. Furthermore, the sighting target portion of the present invention may be altered in shape and size to provide a modified target image from any direction over 360 degrees in a different selected plane. Accordingly, all such modifications and additions are deemed to be within the scope of the invention which is to be limited only by the claims appended hereto.

I claim:

1. A retro-reflective prism assembly of the type having at least one prism for reflecting light received from a distant light source for measuring the precise distance between the assembly and the source; the assembly comprising:

a cylindrical housing having a cylindrical wall defining a longitudinal axis and having a plurality of prism receptacles spaced around said cylindrical wall;

a plurality of retro-reflective prisms, one such prism in each of said respective receptacles, whereby incident light received from any direction in a plane substantially perpendicular to said longitudinal axis of said cylindrical housing is reflected by at least one of said prisms;

said plurality of receptacles comprising two sets of symmetrically spaced receptacles, said sets being spaced from one another along said longitudinal axis; and wherein each such set comprises three receptacles positioned at 120 degree intervals around said cylindrical wall.

2. The assembly recited in claim 1 wherein there are six receptacles and six prisms spaced symmetrically about said housing at about 60 degree intervals.

3. The assembly recited in claim 1 wherein the receptacles of one said set are space at 60 degree intervals relative to the receptacles of the other said set.

4. The assembly recited in claim 1 further comprising a sighting target positioned coaxially with said axis of said housing and providing a target image in all directions in a plane substantially perpendicular to said longitudinal axis.

5. The assembly recited in claim 6 wherein said sighting target comprises a pair of intersecting target elements, each such target element providing diamond-shaped image.

6. A retro-reflective prism assembly of the type having at least one prism for reflecting light received from a distant light source for measuring the precise distance between the assembly and the source; the assembly comprising:

a sighting target presenting a target image in all azimuth plane directions without requiring rotation of said assembly;

a housing having a plurality of prism receptacles spaced around the exterior surface of said housing;

a plurality of retro-reflective prisms, one such prism in each of said respective receptacles, whereby incident light received from any direction in a pre-defined plane is reflected by at least one of said prisms;

wherein there are six receptacles and six prisms spaced symmetrically about said housing at about 60 degree intervals; and wherein three of said prisms are located along a first common plane and the remaining three of said prisms are located along a second common plane spaced from said first common plane.

7. The assembly recited in claim 6 wherein said sighting target comprises a pair of intersecting target elements, each such target element providing a diamond-shaped image.

* * * * *